Sept. 23, 1952　　　G. H. F. WALTON　　　2,611,850
THERMOSTATIC CONTROL SYSTEM FOR OVENS
Filed April 26, 1949
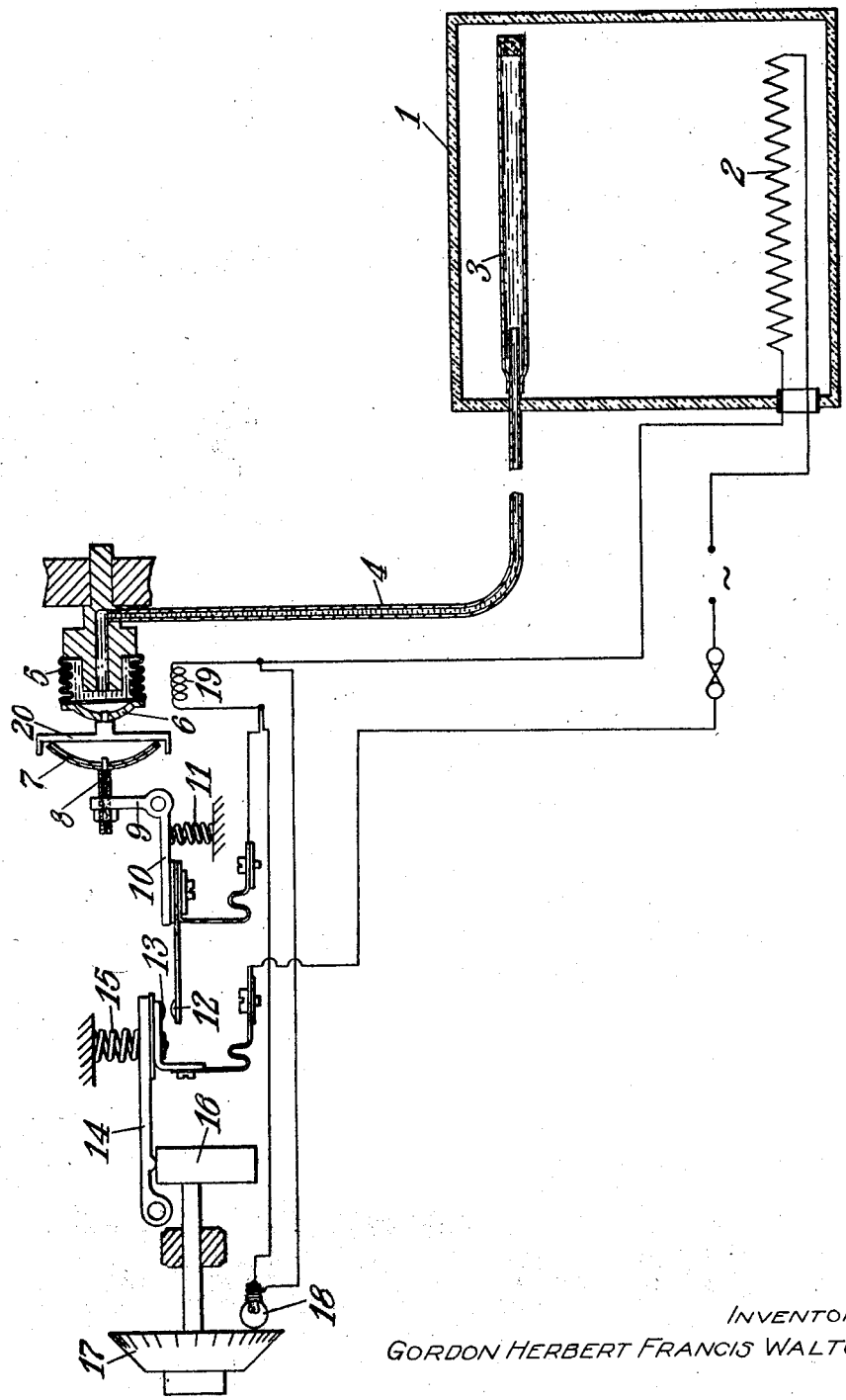
INVENTOR
GORDON HERBERT FRANCIS WALTON
BY
Lindsey, Prutzman + Just
ATTORNEYS Patented Sept. 23, 1952

2,611,850

UNITED STATES PATENT OFFICE 2,611,850

THERMOSTATIC CONTROL SYSTEM FOR OVENS

Gordon Herbert Francis Walton, London, England, assignor to "Diamond H" Switches Limited, London, England Application April 26, 1949, Serial No. 89,751
In Great Britain April 30, 1948

6 Claims. (Cl. 219—20)

This invention relates to thermostatic control systems of the kind which while capable of general application, are more usually employed for the actuation of electric switches, gas valves or the like, for automatically controlling the heating medium for domestic or industrial ovens, heaters, or refrigerators and like appliances (herein called ovens), the temperature of which is to be regulated within predetermined limits.

The invention is broadly concerned with the solution or alleviation of the problems involved in the lag which occurs between the detection at the thermostatic sensitive element in the oven of the conditions to be regulated, and the actuation of the means for accomplishing correction. This lag defect is more marked in systems wherein an expansible fluid (i. e. gas, vapour or liquid) is enclosed in a phial, capillary, and bellows systems, and operates as the sensitive medium, the expansion and contraction of which causes a flow (via the capillary tube) into the bellows or like actuator for a switch or valve controlling the heating medium of the oven.

One disadvantage of such a system is caused by the fact that variations of ambient temperature at the bellows affect the accurate regulation of the temperature of the oven, depending upon the ratio of the quantity of sensitive medium in the said bellows with that in the phial. This defect is commonly counteracted by the use of a bimetallic device adapted to compensate for said temperature variations.

Another disadvantage of the system arises from the lack of sensitivity due to the thermal mass of the phial and the time factor involved in the penetration of the heat changes before such can take effect upon the sensitive medium. For example, in an electrically heated oven wherein switch contacts are operated by the bellows, a substantial period is occupied in heating up the oven and the temperature continues to rise or "overshoot" after the switch contacts have parted, and this initial overshoot is significant. The rate of fall of the temperature in the oven will generally be much faster than the fall in the temperature in the sensitive medium in the phial, and consequently the oven temperature will fall below the required temperature before the contacts again close, when an overshoot will be repeated.

The swing above and below the control temperature or "operating differential" as it is called, may be as much as plus or minus 30° F. and must be avoided if close limits of oven temperature variation is required.

It is the object of the present invention to overcome the second of the disadvantages discussed above in a simplified and effective manner and a further object is to afford such result with the minimum alteration of or addition to existing forms of control.

The invention comprises a thermostatic control system of the type employing a fluid sensitive medium and a compensated bellows or the like, in which a subsidiary heater in series or parallel with the oven heating medium is located to impart heat to the bellows, the compensating means for which is of such mass or is screened from the subsidiary heater that while compensating for the mean rise and fall in bellows temperature remains unaffected to any significant extent by the temperature fluctuations produced by the heat conditions of said heater as determined by the changes in the supply of the oven heating medium.

In the accompanying drawing:

The figure is a partly diagrammatic view showing the general arrangement of a thermostatic control system according to the invention for an oven heater employing fluid as the heat sensitive medium and having electric heating elements in the oven.

A mode of carrying the invention into effect will be described below by way of example, as applied to a known arrangement of a thermostatic control system employing fluid as the sensitive medium and having electric heating elements in the oven. According to this known arrangement a phial filled with heat sensitive liquid is suitably located in the oven and is connected by a capillary tube to a bellows which is coupled to a plate contacting with a bowed ambient temperature compensator in the form of a bimetallic strip. This bimetallic strip is adjustably connected to the arm of a bell-crank lever supporting an electric contact in the circuit of the oven heating resistance. The displacements of the bellows under the expansion and contraction of the sensitive liquid are transmitted to the contact which moves to make and break the circuit with a co-operating contact in the circuit which is carried by a pivoted or otherwise adjustable lever or the like, spring-pressed into contact with an adjusting cam, rotatable by a calibrated manipulated dial.

In carrying the invention into effect according to one convenient mode, applied by way of example to the system described above as illustrated in the figure, there is provided an oven 1 having a heating resistance 2, and suitably located in the oven is a phial 3 filled with sensitive liquid and connected by a capillary tube 4 to a bellows 5 which is coupled to a plate 6 arranged so that displacement thereof can be transmitted to a bowed ambient temperature compensator in the form of a bimetallic strip 7. This bimetallic strip is adjustably connected by means of a threaded rod 8 to an arm 9 of a bellcrank lever, the other arm 10 of which is loaded by a spring 11 and carries an electric contact 12 in the circuit of the oven heating resistance 2. The displacements of the bellows 5 under the expansion and contraction of the sensitive liquid are transmitted to the contact 12 which moves to make and break the circuit with a co-operating contact 13 in the circuit which is carried by a pivoted lever loaded by a spring 15 into contact with an adjusting cam 16 rotatable by a calibrated dial 17. A pilot lamp 18 is included in the heating circuit. According to the invention a subsidiary heating coil 19 is connected in series (or parallel) with the circuit to the heating resistance 2 and is located adjacent the bellows 5. The arrangement is such that the heat fluctuations in the heating coil, which accord with the changes in current supplied to the oven heater, take effect upon the bellows. In order that these fluctuations shall not affect the ambient temperature compensator, the bimetallic strip is screened from the heat developed by the subsidiary heating coil. This is effected by interposing an insulating plate 20 between the bimetallic strip 7 and the heater 19 or the plate 6 which is actuated by the bellows. Alternatively the strip 7 may itself be constructed as a heat insulator or screen, or may have insulating material applied thereto.

In the operation of the system the dial 17 is turned to the temperature required and this causes the contact 13 to be positioned so that it closes with the contact 12, and such that the contacts will not part until the bellows has expanded to the predetermined amount. The time lag in operation referred to previously will tend to occur in the normal manner but with the subsidiary heater in circuit the heating up period of the oven will always remain substantially the same due to the increase in bellows temperature exceeding the compensation provided by the bimetallic compensator 7. The contacts will part at a lower temperature than the controlled setting by a few degrees due to the added expansion of the liquid in the bellows, and this will appreciably reduce the initial overshoot.

During the cooling period after the parting of the contacts, the bellows will have also dissipated this heat and will allow the switch contact 12 to engage the other contact 13 at a higher temperature than would otherwise be the case, consequently effectively reducing the undershoot. Immediately the contacts touch, the heating resistance of the oven is excited and the subsidiary heater comes into operation and develops heat which causes the bellows to part the contacts again at a temperature lower than the setting, thus neutralising further overshooting.

The overall effect is to reduce the operating differential very appreciably and increase the frequency of cyclic variations while at the same time increasing the speed of parting of the switch contacts. Due to the fact that the bimetallic compensator by its bowing and straightening, compensates the mean temperature rise of the bellows, the accuracy of the thermostat is not affected.

The amount of improvement combatting the operating differential depends upon the expansion characteristics of the bellows and the wattage expended in the subsidiary heating coil. Provision may be made for interchangeable heating coils or for otherwise adjusting the wattage of the subsidiary heater, to enable the operating differential of the thermostat and oven to be reduced or modified as desired.

The invention may also be carried into effect as applied to an oven heated otherwise than by electricity, for example by gas, and according to this application of the invention the electric subsidiary heater oil as described in the previous example is replaced by a small pilot flame preferably in parallel with the main oven heating burners. For example, the normally operating pilot jet could be used in conjunction with the blow-back tube for igniting the oven gas burners. The switch means of the previously described example would be replaced by suitable control valve means.

The invention may also be used in connection with thermostatic heating systems employing snap action switches in order to overcome the lost motion and, therefore, the large internal differential which the use of such switches increases.

In the case of certain vapour operated phial and bellows thermostats the characteristics of the ambient temperature at the bellows are often sufficiently small to be neglected and not to require the use of a bimetallic compensator. In such case a greater expenditure of heater watts at the subsidiary heater for the bellows would be required to effect the improvement.

In the normal liquid type thermostat where the expansion characteristics of the bellows is approximately half the phial sensitivity, an expenditure of about 20 watts in the heater is sufficient to cause the differential to fall to a quarter of its normal value. In all cases it is assumed that the ambient temperature compensator is screened or is of a mass such that while efficiently compensating for the mean ambient temperature of the bellows it is not subjected to the fluctuations of temperature in the subsidiary heater which lies in close proximity to the bellows.

An improvement which will result from the use of this invention will be evident in those cases where the rate of change of temperature in the control medium is extremely small (e. g. in fish friers and the like) and results in difficulty in parting the electric contacts sufficiently rapidly. In the case where a snap action switch is incorporated, the period at zero or negligible pressure is very much prolonged, giving rise to heating or sticking of the contacts; and the application of the invention in connection with such contrivances will enable the contacts to be made or broken by the comparatively rapid fluctuations of the bellows temperature even where the phial temperature is maintained constant, and the invention will result in an increase in life of the contacts and reliability of the unit.

I claim:

1. In a control system for a heater of the type having a main heater, a thermostatic unit employing an expansible fluid medium responsive to heat imparted by the heater to produce controlling movements and having control means responsive to such movements to regulate the heater, a regulator comprising a temperature responsive fluid filled expansible container operatively connected to the control means, a subsidiary heater disposed adjacent to said expansible container to impart heat thereto and controlled by said control means so that its heat output is changed with that of the main heater, and compensating means associated with the expansible container to neutralize the effect of the rise and fall of ambient temperature, the said compensating means being constructed and arranged so that while compensating for changes in the mean expansible container temperature it remains unaffected to any significant extent by temperature fluctuations produced by the heating of the subsidiary heater, whereby the overall sensitivity of the control is increased.

2. In a control system for a heater of the type having a main heating element, a thermostatic unit employing an expansible fluid medium responsive to heat imparted by the heating element to produce controlling movements and having switch means responsive to such movements to energise or de-energise the heating element, a regulator comprising a temperature responsive fluid filled expansible container operatively connected to the switch means, a subsidiary heater disposed adjacent to said expansible container to impart heat thereto and controlled by said switch means so that its heat output is changed with that of the main heating element, and compensating means associated with the expansible container to neutralize the effect of the rise and fall of ambient temperature, the said compensating means being constructed and arranged so that while compensating for changes in the mean expansible container temperature it remains unaffected to any significant extent by the temperature fluctuations produced by the heating of the subsidiary heater, whereby the overall sensitivity of the control is increased.

3. In a control system for a heater of the type having a main heater, a thermostatic unit employing an expansible fluid medium responsive to heat imparted by the heater to produce controlling movements and having control means responsive to such movements to regulate the main heater, a regulator comprising a temperature responsive fluid filled bellows operatively connected to the control means, a subsidiary heater disposed adjacent to said bellows to impart heat thereto and controlled by said control means so that its heat output is changed with that of the main heater, movement compensating means associated with the bellows to neutralize the effect thereon of the rise and fall of ambient temperature, and heat insulating means disposed between said compensating means and the subsidiary heater whereby compensation is afforded for changes in the mean bellows temperature but the compensating means is substantially unaffected by fluctuations produced by the heating of the subsidiary heater and the overall sensitivity of the control is thereby increased.

4. In a control system for a heater of the type having a main heating element, a thermostatic unit employing an expansible fluid medium responsive to heat imparted by the heating element produce controlling movements and having a switch responsive to said movements to energise and de-energise the main heating element, a regulator comprising a temperature responsive fluid filled bellows operatively connected to the switch, a subsidiary electrical resistance heating element disposed adjacent to said bellows to impart heat thereto and in circuit relation with the main heating element so that its heat output is changed with the latter, movement compensating means comprising a bi-metallic member associated with the bellows to neutralize the effect thereon of the rise and fall of ambient temperature, and heat insulating means disposed between said bi-metallic compensating means and the subsidiary heating element whereby compensation is afforded for changes in the mean bellows temperature but the compensating means is substantially unaffected by fluctuations produced by the heating of the subsidiary heating element and the overall sensitivity of the control is thereby increased.

5. In a control system for a heater of the type having a main heating element, a thermostatic unit employing an expansible fluid medium responsive to heat imparted by the heater to produce controlling movements and having control means responsive to such movements to regulate the heater, a regulator comprising a temperature responsive fluid filled bellows, a capillary tube connecting said bellows and said thermostatic unit, an operative connection between said bellows and said control means, a subsidiary heater disposed adjacent to said bellows to impart heat thereto and controlled by said control means so that its heat output is changed with that of the main heater, movement compensating means comprising a bi-metallic member associated with the operative connection of said bellows to neutralize the effect thereon of changes in ambient temperature, and heat shielding means disposed between said compensating means and the subsidiary heater whereby compensation is afforded for changes in the mean bellows temperature but the compensating means is substantially unaffected by fluctuations produced by the subsidiary heater and overall sensitivity of the control is thereby increased.

6. In a control system for a heater of the type having a main resistance heating element, a thermostatic unit employing an expansible fluid filled medium responsive to heat imparted by the heating element to produce controlling movements and having switch means responsive to such movements to energize or de-energize the heating element, a regulator comprising a temperature responsive fluid filled bellows operatively connected to the switch means, a capillary tube connecting said bellows and said thermostatic unit, a subsidiary electrical resistance heating element disposed adjacent to said bellows to impart heat thereto and in circuit relation with the main heating element so that its heat output is changed with the latter, movement compensating means comprising a bi-metallic member associated with the operative connection of said bellows to neutralize the effect thereon of changes in ambient temperature, and heat shielding means disposed between said compensating means and the subsidiary heating element whereby compensation is afforded for changes in the mean bellows temperature but the compensating means is substantially unaffected by fluctuations produced by the subsidiary heating element and the overall sensitivity of the control is thereby increased.

GORDON HERBERT FRANCIS WALTON.

REFERENCES CITED

The following references are of record in the file of this patent:

UNITED STATES PATENTS

| Number | Name | Date |
|---|---|---|
| 1,321,287 | Daly et al. | Nov. 11, 1919 |
| 1,572,990 | Colby | Feb. 16, 1926 |
| 1,606,858 | Wilhjelm | Nov. 16, 1926 |
| 1,873,421 | Kanter | Aug. 23, 1932 |
| 1,885,053 | Slough | Oct. 25, 1932 |
| 2,125,627 | Fonseca | Aug. 2, 1938 |
| 2,179,811 | Brosseau | Nov. 14, 1939 |
| 2,273,734 | Pearce | Feb. 17, 1942 |

FOREIGN PATENTS

| Number | Country | Date |
|---|---|---|
| 323,574 | Great Britain | Jan. 9, 1930 |